United States Patent [19]

Siegmund et al.

[11] Patent Number: 5,247,368
[45] Date of Patent: Sep. 21, 1993

[54] METHOD AND APPARATUS FOR THE TRANSMISSION OF A TELEFAX MESSAGE

[75] Inventors: Wolfgang Siegmund; Paul-Gerhard Mayer; Anette Ziemke; Josef Fellerer, all of Munich, Fed. Rep. of Germany

[73] Assignee: Siemens Aktiengesellschaft, Munich

[21] Appl. No.: 769,213

[22] Filed: Oct. 1, 1991

[30] Foreign Application Priority Data

Sep. 28, 1990 [EP] European Pat. Off. ........ 90118725.5

[51] Int. Cl.$^5$ ........................ H04N 1/21; H04N 1/32
[52] U.S. Cl. .................................. 358/402; 358/440; 358/444; 358/468
[58] Field of Search ............... 358/402, 403, 407, 440, 358/439, 434, 468, 444

[56] References Cited

U.S. PATENT DOCUMENTS

| 4,581,656 | 4/1986 | Wada . | |
|---|---|---|---|
| 4,646,160 | 2/1987 | Iizuka et al. | 358/402 |
| 4,769,719 | 9/1988 | Endo . | |

FOREIGN PATENT DOCUMENTS

| 0117871 | 9/1984 | European Pat. Off. |
|---|---|---|
| 0335838 | 2/1990 | European Pat. Off. |
| 0368250 | 5/1990 | European Pat. Off. |
| 3541003 | 5/1986 | Fed. Rep. of Germany . |

OTHER PUBLICATIONS

"Design For Facsimile Storage & Conversion Processing In STOC-201", Shimamura et al., Review of the Electrical Communication Laboratories, vol. 33, No. 1, (1985) pp. 31-39.

Siemens AG "System HICOM 300 Tele-Communications Service", order No. A-19100-K3163-G585, pp. 1-22.

"Message Handling System Programs", Yatani et al., Review of the Electrical Communication Laboratories, vol. 32 (1984) No. 6, Tokyo, Japan, pp. 985-994.

*Primary Examiner*—Edward L. Coles, Sr.
*Assistant Examiner*—Scott A. Rogers
*Attorney, Agent, or Firm*—Hill, Steadman & Simpson

[57] ABSTRACT

Method for the transmission of a telefax message. The method is used for transmitting a telefax message from a telefax terminal equipment (TF) at a transmission side to a plurality of telefax terminal equipment (RF1 ... RFn) at a reception side. The telephone numbers of the telefax terminal equipment (RF1 ... RFn) are input into an operating unit (KB) of the telefax terminal equipment (TF) of the transmission side and are stored in a data area (COMFIL). Picture elements of the on original telefax message are converted into electrical picture signal elements and are intermediately stored in a further data area (NA) allocated to the first data area (COMFIL). A controller (CC) generates second image signal elements from every telephone number and converts these into, in particular, an original telefax message page format. The second and the first image signal elements are transmitted together to the telefax terminal equipment of the reception side identified by the telephone number.

9 Claims, 3 Drawing Sheets

5,247,368

METHOD AND APPARATUS FOR THE TRANSMISSION OF A TELEFAX MESSAGE

BACKGROUND OF THE INVENTION

The present invention is directed to a method for the transmission of a telefax message.

The medium of telefax (telecopying) is presently widespread and will experience further acceptance, particularly with the continued expansion of integrated services digital networks (ISDN). In addition to delivering a telefax message to exactly one receiver, it is known to transmit the identical telefax message to a plurality of receivers (see European Patent Application No. 83 90 2700.0 (corresponding to U.S. Pat. No. 4,646,160); Review of the Electrical Communication Laboratories 33 (1985) No. 1, pages 31-39, Shimamura, "Design for Facsimile Storage and Conversion Processing in STOC-201"). The product information of Siemens AG "System Hicom 300 Tele-Communications-Service", Order No. A19100-K3163-G585 discloses a communication system that has the performance feature of "multi-address transmission of telefax messages" (pages 6ff of the product information). In this communication system the same telefax message can be communicated to as many as 50 different receivers. When exactly one telefax message in the known communications system is to be transmitted to a plurality of addressees, all appertaining telephone number data or other address-related data are communicated from a transmission-side terminal equipment to a reception-side terminal equipment. Given a plurality of address-related data received at the reception side, the operator of the telefax equipment at the reception side is then confronted with the difficulty of identifying whether the received telefax message is in fact intended for the user or users of the telefax terminal equipment at the reception side. Given a plurality of users in a commercial or official area that, for example, can be reached via a common telefax terminal equipment at the reception side, a corresponding identification of the users that are to receive the telefax message can take a relatively long time.

SUMMARY OF THE INVENTION

It is an object of the present invention to provide a method that facilitates the reception-side allocation of a received telefax message to one of several users of a telefax terminal equipment at the reception side.

In general, the method of the present invention is for the transmission of a telefax message from a telefax terminal equipment at a transmission side to a plurality of telefax terminal equipment at a reception side. A read means in the telefax terminal equipment at the transmission side reads picture elements on the original telefax message in cooperation with a controller and converts these into first electrical image signal elements that are to be transmitted. The first electrical image signal elements are intermediately stored in a non-volatile memory in the telefax terminal equipment at the transmission side. The telefax terminal equipment at the transmission side transmits the picture signal elements following the input of telephone numbers of the telefax terminal equipment at the reception side and, potentially, of a first instruction that triggers the transmission. The controller of the telefax terminal equipment of the transmission side converts data, that is individually associated to a telephone number for each telefax terminal equipment at the reception side, into second electrical image signal elements that are to be transmitted. The controller executes the conversion after the input of telephone-number-associated data of the telefax terminal equipment of the reception side and, potentially, after the input of a second instruction. The controller transmits the first and second image signal elements to the telefax terminal equipment of the reception side that are identified by the telephone-number-associated data.

In a further development of the present invention the controller converts the second image signal elements into an original telefax message page format. An apparatus for implementing the present invention comprises a telefax terminal equipment having a controller containing a program defining the method and at least one memory. The memory has data areas for the acceptance of administration information and another data area for the acceptance of the first image signal elements.

When telefax messages having only one address are received at the telefax terminal equipment of the reception side, an immediate identification can be made as to whether the received telefax message is in fact intended for the user or users of the telefax terminal equipment at the reception side. This advantage is particularly pronounced when a plurality of users can be reached by a common telefax terminal equipment of the reception side. Furthermore, the individual recipients of the message are not informed of further recipients of the same telefax message that is transmitted to one or more further telefax terminal equipment of the reception side. This involves the further advantage in that only a relatively small set of addressees has to be co-transmitted within the framework of the transmission to the telefax terminal equipment of the reception side.

According to another, advantageous embodiment of the present invention, a controller converts a second image signal elements into an original format, whereby the controller can also convert further address-related data individually associated to telephone numbers that are included in second image signal elements. This data, for example, can reference the name of the addressee, the company or department, etc.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
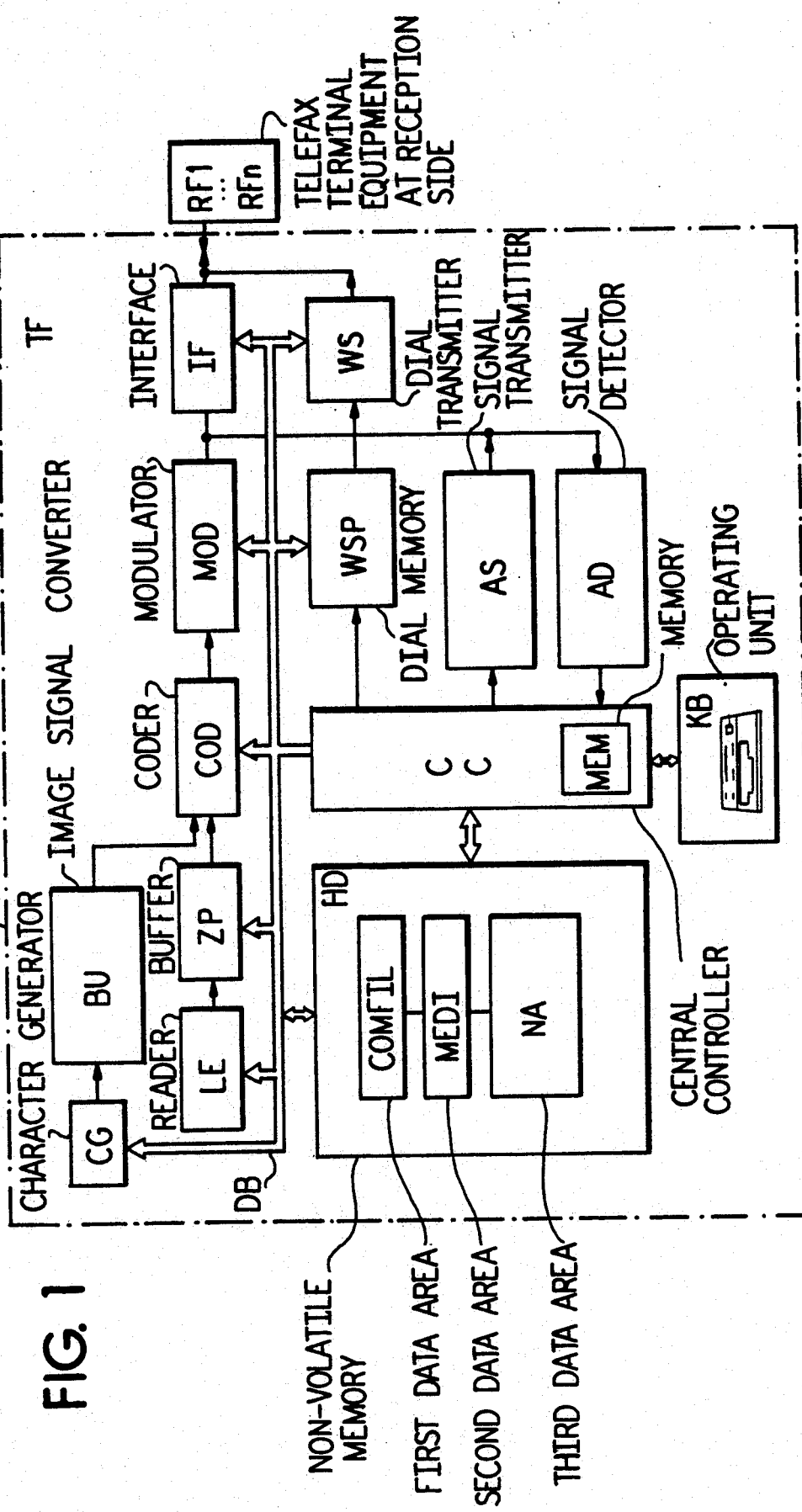
FIG. 1 is a block diagram of an apparatus for the implementation of the method of the present invention.

The apparatus shown in FIG. 1 for the implementation of the method of the present invention is composed of an inherently known telefax terminal equipment (facsimile device). The telefax terminal equipment TF is controlled by a central controller CC to which a data processing program that defines the method of the present invention is allocated. The program is stored in a non-volatile memory HD and is loaded into a volatile memory MEM during operation.

The central controller CC is connected via a data bus DB to a character generator CG, to a reader unit LE, to a line buffer ZP, to a coder COD, to the non-volatile memory HD, to a modulator MOD, to an interface unit IF as well as to a dial memory WSP and to a dial transmitter WS.

Both an executive signal transmitter AS, as well as, an executive signal detector AD are connected between the interface unit IF and the central controller CC. The character generator CG is connected to an image signal converter BU and the latter is connected to the coder COD. Further, the read means LE, the line buffer ZP, the coder COD, the memory HD, the modulator MOD as well as the interface unit IF are series-connected as shown in FIG. 1. The dial memory WSP connected to the controller CC precedes the dial transmitter WS.

An operating unit KB that, in particular, has keys for inputting instructions is also connected to the controller CC.

The character generator CG generates character pattern data dependent on character data that the controller CC supplies. The image signal converter BU that follows the character generator CG converts the character pattern data generated by the character generator CG into image signal elements. The image signal elements are coded by the following coder COD and are transferred into the memory HD. The modulator MOD modulates the intermediately stored image signal elements according to a modulation procedure corresponding to CCITT Recommendations.

The read unit LE reads picture elements arranged on original telefax messages line-by-line and converts the read picture elements into first electrical image signal elements that are to be transmitted. These first electrical image signal elements are intermediately stored in the line buffer ZP and are subsequently transferred into the coder COD. The image signal elements generated by the read means LE are handled by the coder COD and the following units HD, MOD, IF in the same manner as the image signal elements generated by the image signal converter BU.

The executive transmitter AS connected between the controller CC and the interface unit IF transmits executive signals to the interface unit IF in order to transmit image signal elements to a respectively defined telefax terminal equipment RF1 . . . RFn of the reception side in cooperation with the controller CC, particularly according to CCITT Recommendations.

The executive signal detector AD recognizes executive signals that are transmitted from one of the telefax terminal equipment RF1 . . . RFn of the reception side in accordance with a standardized facsimile transmission control method and are received by the interface unit IF. Included among the executive signals are signals that are transmitted in the call set-up phase for identification and selection of the desired device function, referred to as the initiation phase, and signals that are transmitted in the final phase including telephone operation between the telefax terminal equipment participating in a connection.

Figure 2:
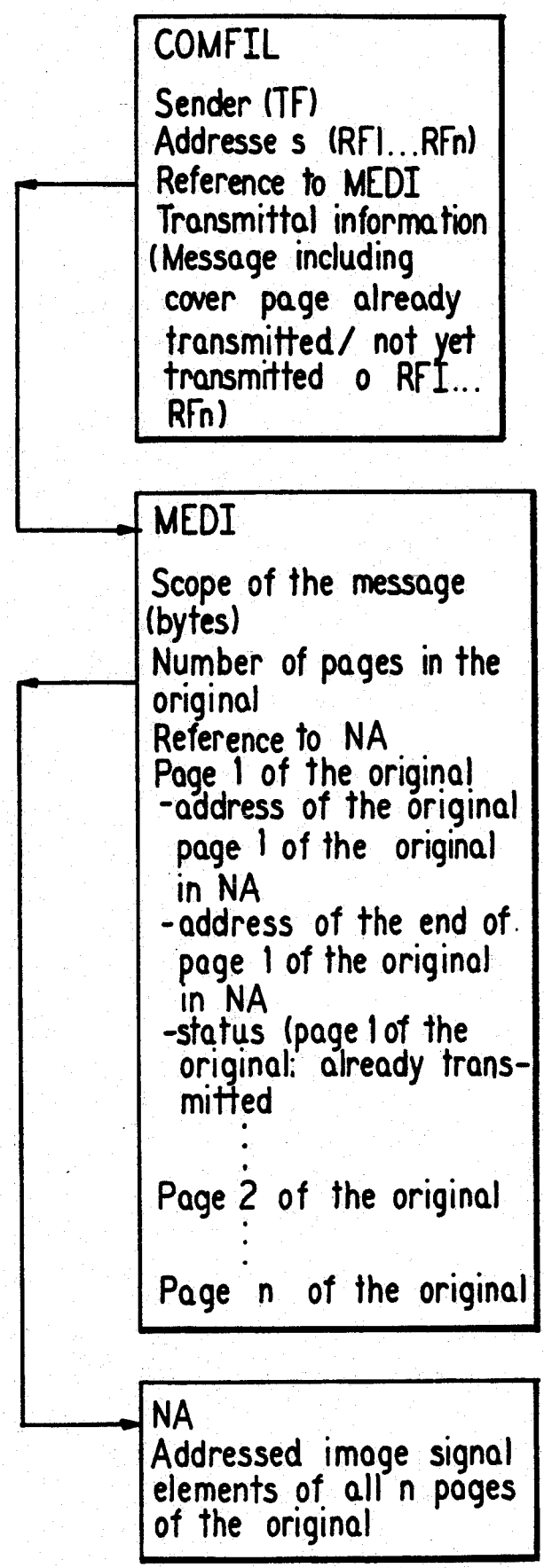
FIG. 2 depicts data areas generated by the controller of the apparatus of FIG. 1.

The non-volatile memory HD shown in FIG. 1 has three units COMFIL, MEDI and NA that are connected to one another. These units indicate data areas that are generated by the program that executes the steps of the method of the present invention. The first data area COMFIL serves for administering transmission requests and, as FIG. 2 shows, contains information about the sender (the telefax terminal equipment TF of the transmission side), and information about the addressees (for example, the telephone numbers of the telefax terminal equipment RF1 . . . RFn at the reception side) as well as reference information that indicates the second data area MEDI allocated to the first data area COMFIL. Moreover, the first data area COMFIL contains what is referred to as transmission information for every addressee that indicates whether the message intended for an addressee has been transmitted or is still pending for transmission.

The second data area MEDI serves for message administration. In a general area, the second data area MEDI contains information about the scope of the message, i.e. the number of bytes, as well as information about the number of pages.

In addition to the general area, the second data area MEDI contains sub-areas individually associated to the pages of the original telefax message. In every sub-area individually associated to the pages of the original telefax message, are stored the address in the third data area NA for the beginning of the respective page of the original telefax message, as well as, the address in the third data area NA for the end of the respective page of the original telefax message. Further, every sub-area individually associated to a page contains status information that indicates whether the respective page of the original telefax message has already been transmitted or, respectively, has not yet been transmitted. The updating of the status information preferably occurs with reference to reception acknowledgement signals that a terminal equipment (RF1 . . . RFn) of the reception side sends back following the transmission of a respective page of the original telefax message. The terminal equipment (RF1 . . . RFn) sends this reception acknowledgement signal back to the telefax terminal equipment TF of the transmission side in a known manner.

The second data area MEDI further contains reference information that indicates the name of the third data area NA that is allocated to the specific, second data area. The image signal elements that the read unit LE generates are stored in the third data area NA according to pages of the original telefax message. At least the address of the beginning of the page of the original telefax message and the address of the end of the page of the original telefax message are communicated from the system and are stored in the second data area MEDI as set forth.

Figure 3:
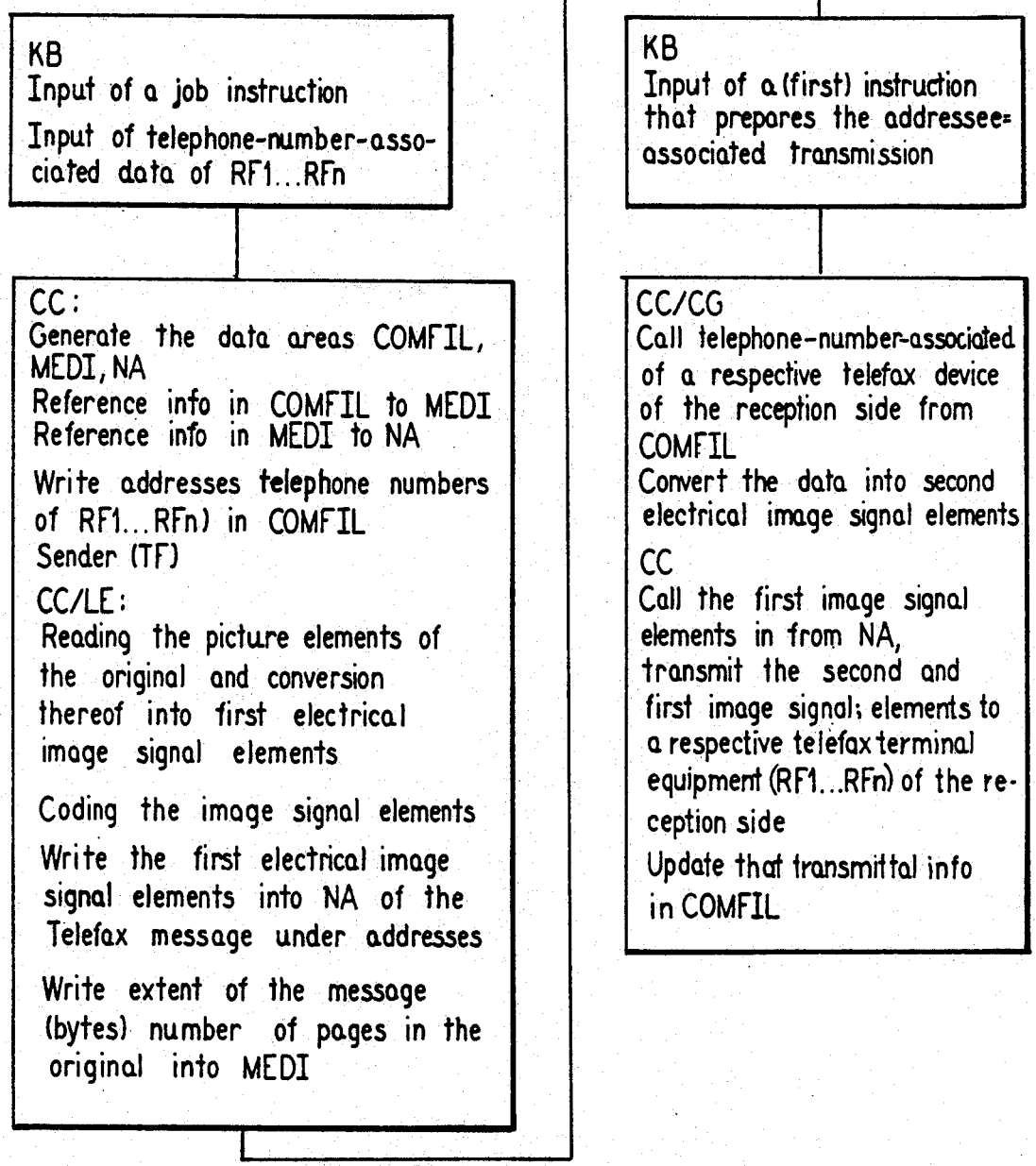
FIG. 3 is a flow chart of the method of the present invention.

The individual method steps of the method of the present invention shall now be set forth with reference to the flow chart depicted in FIG. 3. It is assumed that a telefax message that is composed of one or of a plurality of original pages is communicated to a plurality of telefax terminal equipment at the reception side.

A job instruction ("second instruction") is first input into the operating unit KB. Also, the telephone numbers of the terminal equipment RF1 . . . RFn of the reception side to which the first image signal elements representing the telefax message are to be transmitted are input via the operating unit KB. The controller CC generates the above-described data areas COMFIL, MEDI and NA.

The controller CC writes sender information into the first data area COMFIL that indicates the telefax terminal equipment TF of the transmission side itself as well as all addressee information that each respectively have at least the input telephone numbers of the destination terminal equipment RF1 . . . RFn. Dependent on the address-related information that is input, further address-related information such as, for example, name of the recipient, designation of the company or, respectively, of the department, etc., are compiled from a system data base that is not shown in the figures.

The original telefax message is read line-by-line by the read means LE in a known way and converted into first electrical signal elements. These are intermediately stored in the line buffer ZP and are encoded by the coder COD according to a predetermined method.

The controller CC stores the converted, first image signal elements in the third data area NA under prescribed addresses and transmits the address of each and every start of an original telefax message page and the address of each and every end of an original telefax message page into the sub-areas of the second data area MEDI that are individually associated with the pages of the original telefax message. When all original telefax message pages are read, the controller CC determines the number of bytes of the message, as well as, the number of pages for the original telefax message and stores both particulars in the general area of the second data area MEDI.

Following thereupon, potentially after inputting a further instruction into the operating unit KB and preferably after inputting a instruction ("first instruction") that also triggers the address-associated transmission, the central controller CC produces an individual page of the original telefax message for every addressee on which only address-associated information is contained that indicates the respective receiver of the telefax message. This page of the original telefax message contains no information with respect to further addressees of other individuals who are to receive the identical telefax message. To this end, the controller accesses the first data area COMFIL, calls in the telephone-number-associated data of the respective terminal equipment RF1 . . . RFn of the reception side and routes this data to the character pattern generator CG. The character pattern generator CG generates the corresponding character patterns and forwards them to the image signal converter BU which converts the generated character patterns into second electrical signal elements. To this end, a pixel pattern is generated in a memory for every character from the generated data set, whereby individual points are generated for each data character and combined in such a way that the individual points graphically reproduce the data character. Following thereupon, the generated pixel patterns are converted into telefax coding and are intermediately stored. Such a conversion is disclosed, for example by European patent Application 0 355 838 (hereby incorporated by reference).

The controller CC preferably converts the second image signal elements, the addressee-associated data as well as, potentially, further data that, indicates particulars of the sender, into an original telefax message page format. The receiver thus receives a special page, in particular a first page having this data. The controller CC, further, can convert other addressee-related, telephone-number-associated data that are input or, respectively, are taken from a system data base into second image signals and, as set forth above, can convert these into an original telefax message page format.

Finally, the controller CC calls in the intermediately stored, second image signal elements, as well as, the first image signal elements from the third data area NA and transmits the second and first image signal elements to the telefax terminal equipment RF1 . . . RFn of the reception side indicated by the respective, second image signal elements. With reference to reception acknowledgement signals, individually associated with the pages of the original telefax message, that the respective telefax terminal equipment of the reception side returns to the telefax terminal equipment (TF) of the transmission side, the controller CC updates the status information, individually associated with pages of the original telefax message, that are written in the second data area MEDI. In combination therewith or, respectively, on the basis of a transmission acknowledgement signal communicated by the telefax terminal equipment of the reception side to the terminal equipment of the transmission side in response to an end of message signal (EOM) that was communicated from the terminal equipment of the transmission side, the controller CC updates the transmission information written in the first data area COMFIL.

The method of the present invention can also be implemented in a different sequence of the individual method steps. Thus, for example, it is possible to first form the second image signal elements after the input of the telephone numbers of the telefax terminal equipment RF1 . . . RFn and to subsequently form the first image signal elements following the insertion of the original telefax message.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for the transmission of a telefax message from a transmission telefax terminal equipment to a plurality of reception telefax terminal equipment, a read means in the transmission telefax terminal equipment reading picture elements of an original of the telefax message in cooperation with a controller and converting the picture elements into first electrical image signal elements, the first electrical image signal elements being intermediately stored in a non-volatile memory in the transmission telefax terminal equipment, comprising the steps of:

inputting to the transmission telefax terminal equipment a job instruction;

inputting to the transmission telefax terminal equipment telephone-number-associated data of reception telefax terminal equipment;

converting, by means of the controller in the transmission telefax terminal equipment, the telephone-number-associated data inputted into second electrical image signal elements;

combining the first electrical image signal elements with each of the second electrical image signal elements that correspond to the inputted telephone-number-associated data; and transmitting by means of the controller each of the combined first and second electrical image signal elements from the transmission telefax terminal equipment to only the reception telefax terminal equipment identified by the telephone-number-associated data;

wherein a respective combined first and second electrical image signal elements forms a message to a respective reception telefax terminal equipment that contains no information with respect to identification of other reception telefax terminal equipment which receive respective combined first and second electrical image signal elements.

2. The method according to claim 1, wherein the method further comprises converting by means of the controller the second electrical image signal elements into an original telefax message page format.

3. The method according to claim 1, wherein the controller transmits the first and second electrical image signals after the input of telephone-number-associated data, and after receiving a first instruction from the telefax terminal equipment at the reception side and after input of a second instruction to the controller.

4. An apparatus for the transmission of a telefax message from transmission telefax terminal equipment to a plurality of reception telefax terminal equipment, comprising:

transmission telefax terminal equipment having means for reading picture elements of an original telefax message and for converting the picture elements into first electrical image signal elements;

the transmission telefax terminal equipment having a controller connected to at least one memory, said memory having at least one data area for storing administration information and another data area for storing the first image signal elements, the one data area for storing administrative information having a first data area for storing at least information regarding a sender of the original telefax message, information regarding addresses, and reference information, and a second data area for storing at least information regarding a scope of the original telefax message and information regarding a number of pages in the original telefax message, the reference information indicating allocation of the second data area to the first data area;

the controller also connected to said means for reading and converting; and the controller having a program for converting data, that is individually associated with telephone numbers for respective reception telefax terminal equipment, into second electrical image signal elements;

wherein, after at least the input of telephone-number-associated data of the reception telefax terminal equipment, the controller transmits respective first and second image signal elements to reception telefax terminal equipment identified by the telephone-number-associated data.

5. The apparatus according to claim 4, wherein the apparatus further comprises input means for inputting the telephone-number-associated data and for inputting an instruction for initiating transmission of the first and second image signal elements, said input means connected to said controller.

6. The apparatus according to claim 5, wherein the controller transmits the first and second image signals after the input of telephone-number-associated data, and after receiving a first instruction from the telefax terminal equipment at the reception side and after input of a second instruction to the controller.

7. The apparatus according to claim 4, wherein the second data area has sub-areas individually associated to the pages of the original telefax message.

8. The apparatus according to claim 7, wherein each sub-area of the sub-areas of the second data area stores at least an address for the beginning of a respective page of the original telefax message and an address for an end of the respective page of the original telefax message.

9. The apparatus according to claim 8, wherein each sub-area further stores status information associated with each page of the original telefax message that indicates whether or not the respective page of the original telefax message has been transmitted.

* * * * *